United States Patent
Wolf

(10) Patent No.: US 10,807,616 B2
(45) Date of Patent: Oct. 20, 2020

(54) SYSTEM FOR IDENTIFYING A SEAT LOCATION

(71) Applicant: SIEMENS MOBILITY GMBH, Munich (DE)

(72) Inventor: Guenter Wolf, Nuremberg (DE)

(73) Assignee: Siemens Mobility GmbH, Munich (DE)

( * ) Notice: Subject to any disclaimer, the term of this patent is extended or adjusted under 35 U.S.C. 154(b) by 374 days.

(21) Appl. No.: 15/742,160

(22) PCT Filed: Jun. 23, 2016

(86) PCT No.: PCT/EP2016/064509
§ 371 (c)(1),
(2) Date: Jan. 5, 2018

(87) PCT Pub. No.: WO2017/005495
PCT Pub. Date: Jan. 12, 2017

(65) Prior Publication Data
US 2018/0201280 A1    Jul. 19, 2018

(30) Foreign Application Priority Data
Jul. 9, 2015    (DE) .......................... 10 2015 212 867

(51) Int. Cl.
*B61D 41/04*    (2006.01)
*G06Q 10/02*    (2012.01)
(Continued)

(52) U.S. Cl.
CPC ......... *B61D 41/04* (2013.01); *B61D 33/0007* (2013.01); *B61L 15/0072* (2013.01);
(Continued)

(58) Field of Classification Search
CPC . B61D 41/04; B61D 33/0007; B61L 15/0072; B61L 15/009; B61L 27/0077; G06Q 10/02; G08B 5/221
(Continued)

(56) References Cited

U.S. PATENT DOCUMENTS 3,750,103 A * 7/1973 Angus .................... G06Q 10/02
340/4.6
4,298,793 A * 11/1981 Melis .................... G06F 3/0231
235/487
(Continued)

FOREIGN PATENT DOCUMENTS

EP    0659625 A1 *    6/1995    ............. B61D 41/04
EP    0659625 A1    6/1995
(Continued)

*Primary Examiner* — Justin M Jonaitis
(74) *Attorney, Agent, or Firm* — Laurence Greenberg; Werner Stemer; Ralph Locher

(57) ABSTRACT

A system includes a set of passenger seat devices in a transport unit and a control unit. In order to permit an identification of seat locations to be changeable, a communication unit exchanges data between the set of passenger seat devices and the control unit. The control unit is provided in order to detect a current seat location arrangement as a function of data of the set of passenger seat devices. A method for seat location identification in a transport unit with a set of passenger seat devices is also provided.

13 Claims, 2 Drawing Sheets

(51) Int. Cl.
*G08B 5/22* (2006.01)
*A61L 15/00* (2006.01)
*B61D 33/00* (2006.01)
*A61L 27/00* (2006.01)
*B61L 15/00* (2006.01)
*B61L 27/00* (2006.01)

(52) U.S. Cl.
CPC ............ *G06Q 10/02* (2013.01); *G08B 5/221* (2013.01); *B61L 15/009* (2013.01); *B61L 27/0077* (2013.01)

(58) Field of Classification Search
USPC ........................................................ 105/345
See application file for complete search history.

(56) References Cited

U.S. PATENT DOCUMENTS

| | | |
|---|---|---|
| 7,137,594 B2 | 11/2006 | Mitchell et al. |
| 2007/0061847 A1 | 3/2007 | Callahan et al. |
| 2008/0319946 A1* | 12/2008 | Heyraud ................ G06Q 10/02 |
| 2011/0082714 A1 | 4/2011 | Gaikwad |
| 2013/0262159 A1* | 10/2013 | Montero ................ G06Q 50/14 |
| | | 705/5 |

FOREIGN PATENT DOCUMENTS

| | | |
|---|---|---|
| EP | 2071536 A2 | 6/2009 |
| EP | 2679464 A1 | 1/2014 |
| EP | 2821310 A1 | 1/2015 |
| WO | 2005076248 A1 | 8/2005 |

\* cited by examiner

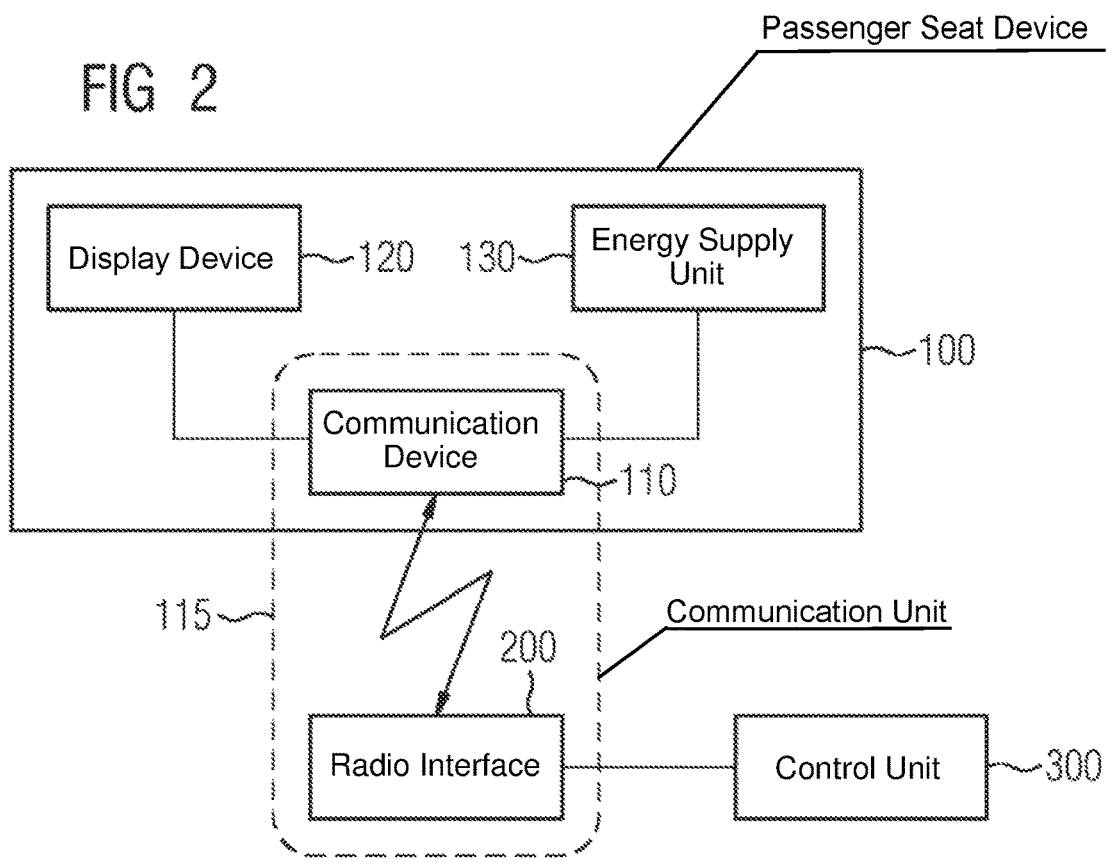
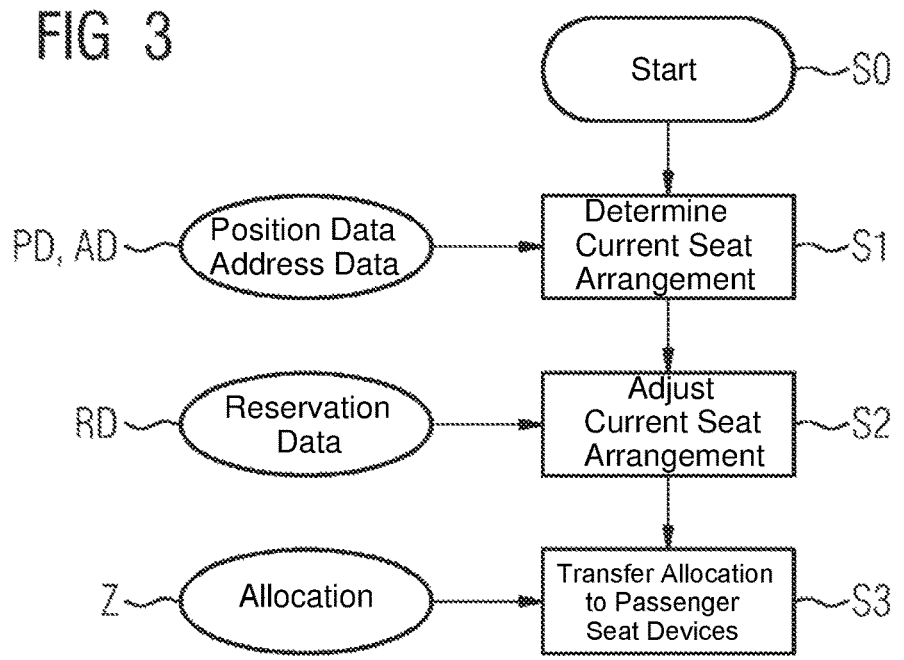

SYSTEM FOR IDENTIFYING A SEAT LOCATION

BACKGROUND OF THE INVENTION

Field of the Invention

The invention relates to a system comprising a set of passenger seat devices and a control unit, as well as a method for seat location identification in a transport unit having a set of passenger seat devices.

An identification of the seat locations is a necessary precondition for safe and comfortable transport of passengers in a transport unit. Operators of transport businesses must thus change the seat location arrangement of a transport unit and adapt it to the numbers of passengers. With a change of the seat location arrangement, the number of seat locations, tables and the positions thereof also change. For example, a seat location group with seat locations and a table is replaced by a row arrangement of seat locations. An existing identification of the seat locations is unavoidably disrupted thereby and is no longer useful to passengers as identification. Following the construction of a new seat location arrangement, the identification of the seat locations must be carried out anew.

From EP 2 071 536 A2, there is known a method for remotely controlled numbering of chairs or tables arranged in a row beside one another. Each chair or table has an electronic display device and an interface that is influenceable by means of a remote control unit. The remote control unit transfers a place number to an edge chair. This is displayed by the display device and passed on, incremented or decremented by one, to the next chair or table.

SUMMARY OF THE INVENTION

It is an object of the present invention to provide a system with a set of passenger seat devices in a transport unit and a control unit wherein the identification of seat locations is changeable.

For this purpose, it is proposed that the system has a communication unit for data exchange between the set and the control unit and the control unit detects a current seat location arrangement dependent upon data of the set.

In that the control unit receives from the communication unit data from the set of a plurality of passenger seat devices, the control unit detects the current seat location arrangement and, on the basis of the current seat location arrangement can specify a new identification of the seat locations. The seat location arrangement can be changed quickly and easily by the specialist personnel without expending a great deal of time and effort for the identification of seat locations. The identification of the seat locations in a new seat location arrangement of a transport unit is undertaken by the system almost automatically. Such a system offers operators of transport businesses, in particular railroad operators, a high degree of flexibility in the identification of seat locations. The system serves also for the identification of a false seat arrangement and can notify this to the specialist personnel.

The control unit is preferably arranged in the transport unit. Furthermore, it can be a component of a control system which has at least components on the land side. In particular, it can itself be arranged on the land side. An advantageous development of the invention is provided by a system in which the control unit evaluates the data of the set on the basis of data stored in the control unit. For example, the data of the set is adjusted with a seat arrangement stored in the control unit. The evaluated data is passed on to at least one passenger seat device of the set, preferably a plurality of passenger seat devices. The data of the set regarding the current seat arrangement and the processing together with data stored in the control unit permits a new identification of the seat locations to be undertaken quickly and with little effort.

The communication unit suitably has, on the side of the set of passenger seat devices, at least one communication means and, on the side of the control unit, at least one interface, wherein the communication means and the interface are provided for data exchange. In an advantageous embodiment, a plurality, e.g. all, of the passenger seat devices have such a communication means. The communication means of a plurality of passenger seat devices can also be provided for data exchange among one another.

Advantageously, the control unit is provided for data exchange via a radio interface with at least one of the passenger seat devices, so that the installation and cabling effort as well as the costs can be substantially reduced during the construction phase of the transport unit.

According to an advantageous development of the invention, passenger seat devices of the set each have a communication means configured as a radio unit which is provided for creating a radio connection with the radio interface. The radio unit of a passenger seat device can establish a connection with the control unit or a second passenger seat device, and exchange data. Herein, the data is transferred wirelessly between the passenger seat device and the radio interface or between the passenger seat devices among themselves, for example, on the basis of a so-called ZigBee, Bluetooth or WLAN technology. A data communication between passenger seat devices can also take place wirebound.

A further advantageous embodiment of the system is provided in that the passenger seat devices each comprise at least one display device and at least one or more seat locations and/or table. For example, the passenger seat device has a seat location and a display device allocated or allocatable to the seat location which displays an identification of the seat location during operation. In this way, the control unit can also address and individually identify a single seat location. A further embodiment of the passenger seat device comprises a table, a plurality of seat locations adjoining the table and the associated display device. During operation, this can display identifications for the individual seat locations or a common identification for the whole table and seat group. The inventive system enables a seat location arrangement to be realized which at the time point of the planning of the transport unit were not yet foreseeable.

Advantageously, the display device is a display which is integrated into the seat location. Alternatively or additionally—in particular, continuously—it can extend at least over a substantial part of the transport unit. The display is subdivided into a plurality of display regions wherein the display regions are allocatable to a passenger seat device. A "substantial part" of the transport unit advantageously represents a length in which the seat locations of the transport unit are also accommodated, or at least 50% preferably at least 75% of the length of the transport unit. The display device is preferably arranged at a suitable site, readily visible to the passenger, e.g. at a front edge of a luggage shelf.

The data of the set preferably contains at least addressing data concerning addresses of the passenger seat devices. An address serves herein for the identification of a particular passenger seat device in the set. For example, it can be a physical address, e.g. a serial number or a WLAN-MAC address.

Suitably, the evaluated data comprises an allocation of a seat location identification to an address. By this means, the seat location identification of seat locations is readily changed and is associated with little temporal effort and cost. A change of the seat location arrangement in the transport unit can be undertaken purely mechanically and can spare the specialist personnel further activities such as the connection of plugs of a seat location and encoding a new seat location number. The seat location identification can contain a seat location number or any desired specified, unambiguous sign. It should be a systematic seat location identification that is readily understood by the passenger.

It is further proposed that the data of the set comprises at least position data from which a position of at least one of the passenger seat devices in the transport unit is determinable. This position data can be position information, for example, coordinates which are communicated to the control unit.

If the control unit is provided for data exchange via a radio interface with at least one of the passenger seat devices, an advantageous embodiment of the invention provides that the position data comprises the signal transit times, field strength and/or signal strength of a signal of the transmitting passenger seat device received by the radio interface. The control unit usefully evaluates the position data. In order to determine the position from the signal transit time, field strength or signal strength, algorithms such as WLAN-based locating can be used. The technology used must permit sufficiently accurate locating of the passenger seat device and usefully also has a data channel for transfer of the data.

In the determination of the position of the passenger seat device, the aforementioned radio interface advantageously serves as a reference point in the transport unit. In the transport unit, one or more radio interfaces are suitably firmly mounted at previously determined sites.

In a particularly advantageous embodiment of the inventive system, it is further provided that the data stored in the control unit comprises reservation data. This design permits the control unit to adjust the data of the set with the reservation data. In addition to a seat location identification, the display device can also display further information that is stored in the control unit. The further information can contain reservation data which has been transferred from the reservation system to the control unit.

In a further embodiment, the seat location identification is visibly displayed on the display device for each passenger for orientation.

In a further very favorable embodiment, the passenger seat device can comprise an energy supply unit. The energy supply unit converts kinetic energy into electrical energy. The kinetic energy is herein a travel movement transferred from the transport unit to the passenger seat device, in this case, movement energy of the transport unit. The electrical energy is used for the operation of the communication unit and the display device. Excess energy can be stored in an energy store, e.g. an accumulator or capacitor and retrieved when needed.

The conversion of the kinetic energy into electrical energy offers a great advantage. The passenger seat device can be supplied with energy autonomously and a connection of the seat locations to a space-bound network supply is not necessary. Elaborate cabling between the seat location and the transport unit can be dispensed with. This saves further costs and effort in the construction of the transport unit.

The transport unit can be a part of a rail vehicle with a large seat location arrangement, in which each seat location can be identified individually and repeatably varyingly identified with a seat location identification. The transport unit can be configured, in particular, as a rail vehicle wagon or a group of rail vehicle wagons.

Advantageously, the control unit can evaluate the data of the set on the basis of data stored in the control unit and passes on the evaluated data to at least one passenger seat device via a radio interface.

It is a further object of the invention to provide a method of the aforementioned type with which data is exchanged between a control unit and the set via a communication unit and a current seat location arrangement is detected by means of the control unit dependent upon data of the set.

Furthermore, a device for indicating seat location information in a transport unit is proposed with a display which in the mounted state extends at least over a substantial part of the transport unit, wherein the display is subdivided into a plurality of display regions and each display region is allocatable to a passenger seat device.

BRIEF DESCRIPTION OF THE SEVERAL VIEWS OF THE DRAWING

An exemplary embodiment of the invention will now be described in the figures, in which:

FIG. 2 shows a schematic representation of an inventive system, FIG. 3 shows an inventive method illustrated schematically in the form of a flow diagram.

DESCRIPTION OF THE INVENTION

Figure 1:
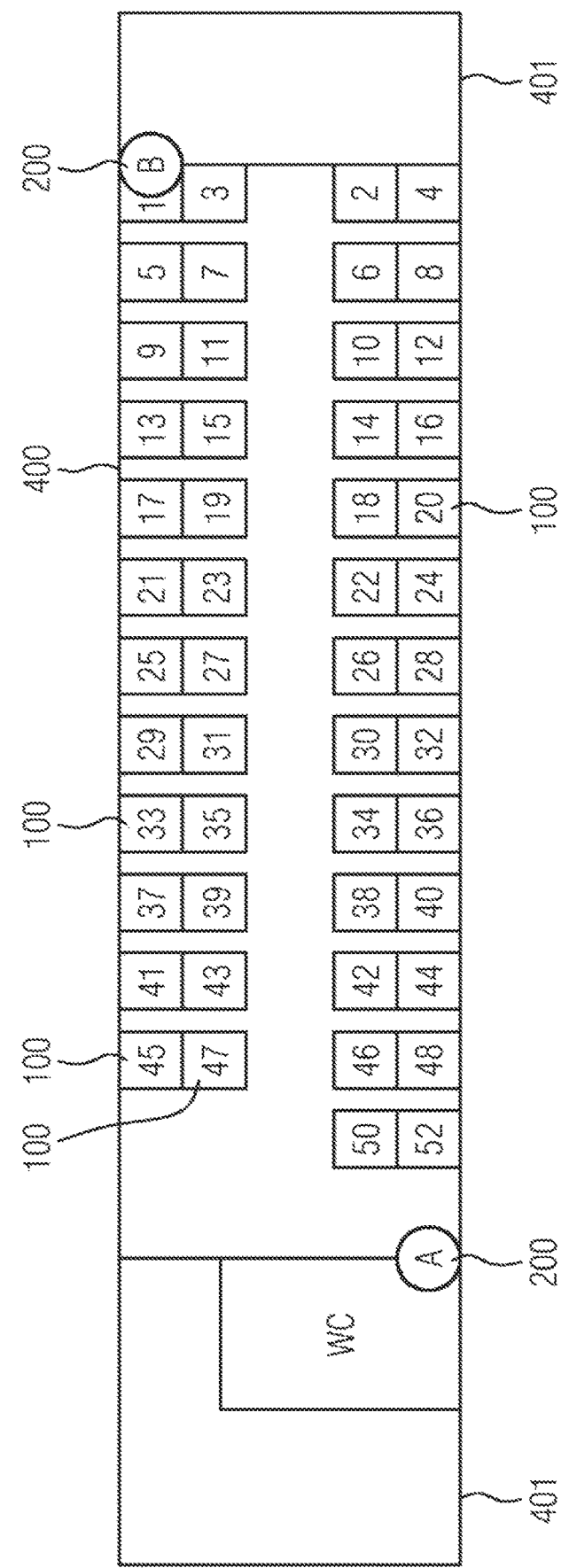
FIG. 1 shows a schematic representation of a transport unit according to the invention.

FIG. 1 shows a transport unit 400 with a set of passenger seat devices 100 in a seat location arrangement, two radio interfaces 200 and two entry and exit regions 401.

A passenger seat device 100 can have a seat location and an allocated display device 120 (see FIG. 2), which is provided to display a seat location identification. By means of a change in the seat location arrangement in the transport unit 400, a further embodiment of one of the passenger seat devices 100 can comprise a table and seat locations adjacent thereto and wirelessly connected to one another.

The transport unit 400 preferably has two radio interfaces 200 which are arranged in the transport unit 400 such that each passenger seat device 100 is reachable, for example, by means of the range of a radio interface 200. In FIG. 1, a radio interface 200 is mounted, in each case, at a predetermined site, e.g. close to an entry and exit region 401.

By means of the unambiguous arrangement of the radio interfaces 200 in the transport unit 400, these serve as reference points in a determination of the position of each passenger seat device 100.

In the representation of FIG. 2, a highly schematically represented system for seat location identification is indicated. FIG. 2 shows one of the passenger seat devices 100, the radio interface 200 and a control unit 300. The passenger seat device 100 has as a communication means 110 configured as a radio unit, a display device 120 and an energy supply unit 130. The communication means 110 and the radio interface 200 are provided for creating a radio connection with one another.

The radio interface 200 receives and transmits data from and/or to the, passenger seat device 100 and passes received data onto the control unit 300. A transfer of the data to and from the control unit 300 can take place both wire-bound, e.g. via Ethernet, and also wirelessly, e.g. via WLAN. The radio interface 200 can comprise a functionality of a wireless access point (WLAN access point). The communication means of the passenger seat device 100 and also the radio interface 200 are components of a communication unit 115 which is provided for data exchange between the set of passenger seat devices 100 and the control unit 300.

The control unit 300 is a central unit and is realized as a software and/or hardware component in the transport unit 400 or externally. It is supplied with data of a reservation system. The control unit 300 is provided to detect a current seat location arrangement.

For this, the set of passenger seat devices 100 of the transport unit 400 transmits data to the control unit 300. The data of the set contains addressing data AD (see FIG. 3) with at least one address of the transmitting passenger seat device 100 and also position data from which the control unit 300 determines the position of the transmitting passenger seat device 100. This position data herein corresponds, for example, to signal transit times, a field strength or a signal strength of the signal, received from the radio interface 200, of the transmitting passenger seat device 100.

From the data of the set, the control unit 300 creates a current seat location arrangement. The current seat location arrangement is adjusted in the control unit 300 with the data stored in the control unit 300. The data stored in the control unit 300 can be data placed there by the reservation system.

Herein, in an allocation, one or more seat location identifications are unambiguously assigned to each passenger seat device 100. In the allocation, each address of a passenger seat device 100 is linked to one or more seat location identifications. The data thus evaluated in the control unit 300 is passed on via the radio interface 200 to the passenger seat devices 100 in the transport unit 400.

The address of a passenger seat device 100 is a physical address and unambiguously identifies the passenger seat device 100 within the transport unit 400. The address can contain a serial number or a WLAN-MAC address. It is not visible to a passenger.

The seat location identification can consist of a seat location number or any identification that is easily understood by the passenger. The seat location identification is visibly displayed for the passenger on the display device 100.

In addition, further information that is stored in the control unit can be transferred to the passenger seat device. The further information can contain reservation data which has been transferred from the reservation system to the control unit 300.

The communication means 110 of a passenger seat device 100 is provided—as discussed above—for data exchange between said seat device and the radio interface 200. It also serves for the communication of a plurality of passenger seat devices 100 among one another. The communication means 110 transfers data wirelessly, for example, on the basis of so-called ZigBee, Bluetooth or WLAN technology. The technology used must permit a sufficiently accurate locating of the passenger seat device and also have a data channel for transfer of the data.

The display device 120 can be designated as a stand-alone display of a passenger seat device. Alternatively, the display device 120 can be designated as a display of a plurality of passenger seat devices 100, wherein the display is then subdivided into display regions. The display regions have a defined size and are located at sites appropriate to each passenger seat device 100. The display regions are identified as "virtual displays" which show a seat location identification.

In addition to the seat location identification, further information is displayed on the display device 120 for the passenger. This can contain information regarding a reservation, for example, reservation data, the route, weather forecast, etc. or safety-related information.

The energy supply unit 130 can be a so-called energy harvester which converts kinetic energy into electrical energy. The kinetic energy is herein a travel movement generated during an installation or transferred from the transport unit to the passenger seat device, in this case, movement energy of the transport unit. The electrical energy is used for the operation of the communication unit and the display device. Excess energy can be stored in an energy store, e.g. an accumulator or capacitor, and retrieved when needed. Due to the conversion and intermediate storage of the energy, the passenger seat device 100 can be autonomously supplied with energy.

FIG. 3 shows a schematically represented flow diagram of the inventive method. In the flow diagram, step S0 denotes the start of the method, once the seat arrangement in the transport unit 400 has been changed by the specialist personnel. The set of passenger seat devices 100 transmit their address data AD and position data via the radio interface 200 to the control unit 300.

On the basis of data of the set originating from the element identified as PD (position data), in step S1, the current seat arrangement is determined. In step S2, the control unit 300 adjusts the current seat arrangement with the reservation data RD stored by the reservation system in the control unit 300.

Herein, the control unit 300 generates an allocation Z in which one or more seat location numbers and further information is assigned to each passenger seat device 100. The further information is reservation data which contains additional information concerning the reservation.

In step S3, the allocation Z is then transferred to the set of passenger seat devices 100 via the radio interface 200. The communication means 110 of the passenger seat devices 100 receive the allocation. The allocation Z permits the display device 120 to display the relevant seat location identification and further information for the passenger seat device 100.

The invention claimed is:

1. A system, comprising:
   a set of passenger seat devices in a transport unit;
   a control unit; and
   a communication unit for a data exchange between said set of passenger seat devices and said control unit, said communication unit having a communication device disposed at a plurality of said passenger seat devices, said communication unit having at least one interface connected to said control unit, and said communication device and said interface being configured for data exchange;
   the data of said set of passenger seat devices including at least position data from which a position of at least one of said passenger seat devices in the transport unit is determinable;
   said control unit being configured to detect a current seat location arrangement in dependence upon data of said set of passenger seat devices.

2. The system according to claim 1, wherein said control unit is configured:
for evaluating the data of said set of passenger seat devices based on data stored in said control unit, and
for passing on the evaluated data to another portion of at least one passenger seat device of said set of passenger seat devices.

3. The system according to claim 1, wherein said control unit is configured for data exchange via a radio interface with at least one of said passenger seat devices.

4. The system according to claim 3, wherein said set of passenger seat devices include passenger seat devices each having a communication device configured as a radio unit for creating a radio connection with said radio interface.

5. The system according to claim 1, wherein said passenger seat devices each include:
at least one display device, and
at least one of a seat location or a table.

6. The system according to claim 5, wherein said display device is configured for displaying a seat location identification.

7. The system according to claim 5, wherein said display device is a display extending at least over a substantial part of the transport unit and is subdivided into a plurality of display regions, and said display regions are each configured to be allocated to a respective passenger seat device.

8. The system according to claim 1, wherein the data of said set of passenger seat devices contains at least addressing data concerning addresses of said passenger seat devices.

9. The system according to claim 2, wherein the evaluated data includes an allocation of a seat location identification to an address.

10. The system according to claim 1, wherein:
said control unit is configured for data exchange via a radio interface with at least one of said passenger seat devices; and
the position data includes signal transit times, field strength or signal strength of a signal of said transmitting passenger seat device received by said radio interface.

11. The system according to claim 10, wherein said radio interface is provided as a reference point for determining a position.

12. The system according to claim 2, wherein the data stored in said control unit includes reservation data.

13. A method for seat location identification in a transport unit having a set of passenger seat devices, the method comprising the following steps:
using a communication unit to exchange data between a control unit and the set of passenger seat devices;
providing the communication unit with a communication device at a plurality of the passenger seat devices;
providing the communication unit with at least one interface connected to the control unit;
exchanging data between the communication device and the interface;
determining a position of at least one of the passenger seat devices in the transport unit from position data included in the data of the set of passenger seat devices: and
using the control unit to detect a current seat location arrangement in dependence upon the data of the set of passenger seat devices.

* * * * *